US008512802B2

(12) United States Patent
Dutt et al.

(10) Patent No.: US 8,512,802 B2

(45) Date of Patent: Aug. 20, 2013

(54) METHOD OF PRODUCING A POLISHED METAL EFFECT FINISH ON A VEHICLE

(75) Inventors: Wilfried Dutt, Wermelskirchen (DE); James G. King, Birmingham, MI (US)

(73) Assignee: Axalta Coating Systems IP Co. LLCDE (US)

( * ) Notice: Subject to any disclaimer, the term of this patent is extended or adjusted under 35 U.S.C. 154(b) by 325 days.

(21) Appl. No.: 12/743,251

(22) PCT Filed: Nov. 24, 2008

(86) PCT No.: PCT/US2008/084460

§ 371 (c)(1), (2), (4) Date: May 17, 2010

(87) PCT Pub. No.: WO2009/073423

PCT Pub. Date: Jun. 11, 2009

(65) Prior Publication Data

US 2010/0272986 A1 Oct. 28, 2010

Related U.S. Application Data

(60) Provisional application No. 61/004,555, filed on Nov. 28, 2007.

(51) Int. Cl.

*B05D 1/36* (2006.01)
*B05D 3/02* (2006.01)
*B32B 5/16* (2006.01)

(52) U.S. Cl.

USPC ..................... 427/203; 427/388.4; 427/385.5; 428/323

(58) Field of Classification Search

USPC ................ 427/100, 385.5, 407.1, 424, 427.6; 428/134, 457, 461

See application file for complete search history.

(56) References Cited

U.S. PATENT DOCUMENTS

| | | | | |
|---|---|---|---|---|
| 3,639,347 | A | 2/1972 | Sugiura et al. | |
| 4,728,543 | A | 3/1988 | Kurauchi et al. | |
| 4,781,949 | A | 11/1988 | Kasari | |
| 5,863,321 | A | 1/1999 | Crumley et al. | |
| 6,093,497 | A * | 7/2000 | Wiemann et al. | 428/500 |
| 6,331,326 | B1 | 12/2001 | Tsunoda et al. | |
| 6,773,759 | B2 * | 8/2004 | Kobayashi et al. | 427/407.1 |
| 2002/0069822 | A1 * | 6/2002 | Dattilo | 118/612 |
| 2003/0175437 | A1 * | 9/2003 | Tsuda et al. | 427/385.5 |
| 2004/0028822 | A1 * | 2/2004 | Dutt et al. | 427/385.5 |
| 2004/0028823 | A1 | 2/2004 | Dutt | |
| 2005/0255330 | A1 * | 11/2005 | Meyer | 428/480 |
| 2006/0008588 | A1 | 1/2006 | Chilla et al. | |
| 2007/0071901 | A1 | 3/2007 | Avgenaki | |

FOREIGN PATENT DOCUMENTS

| | | | |
|---|---|---|---|
| EP | 1591492 | A1 | 3/1985 |
| JP | 2005281601 | A * | 10/2005 |

OTHER PUBLICATIONS

JP 2005281601 English translation.*
JP 2005281601 abstract.*
JP2005281601A translation.*
"Super Metallic Silver Colors" (Y. Mizutami, Y. Nako, and S. Nakamura).

* cited by examiner

*Primary Examiner* — Dah-Wei Yuan
*Assistant Examiner* — Diane Zhang
(74) *Attorney, Agent, or Firm* — Brian J Myers

(57) ABSTRACT

A method for coating motor vehicles with a multi-layer finish that achieves the appearance of polished metal or anodized metal using vacuum metallized flake pigments in one of the coating layers.

8 Claims, 1 Drawing Sheet

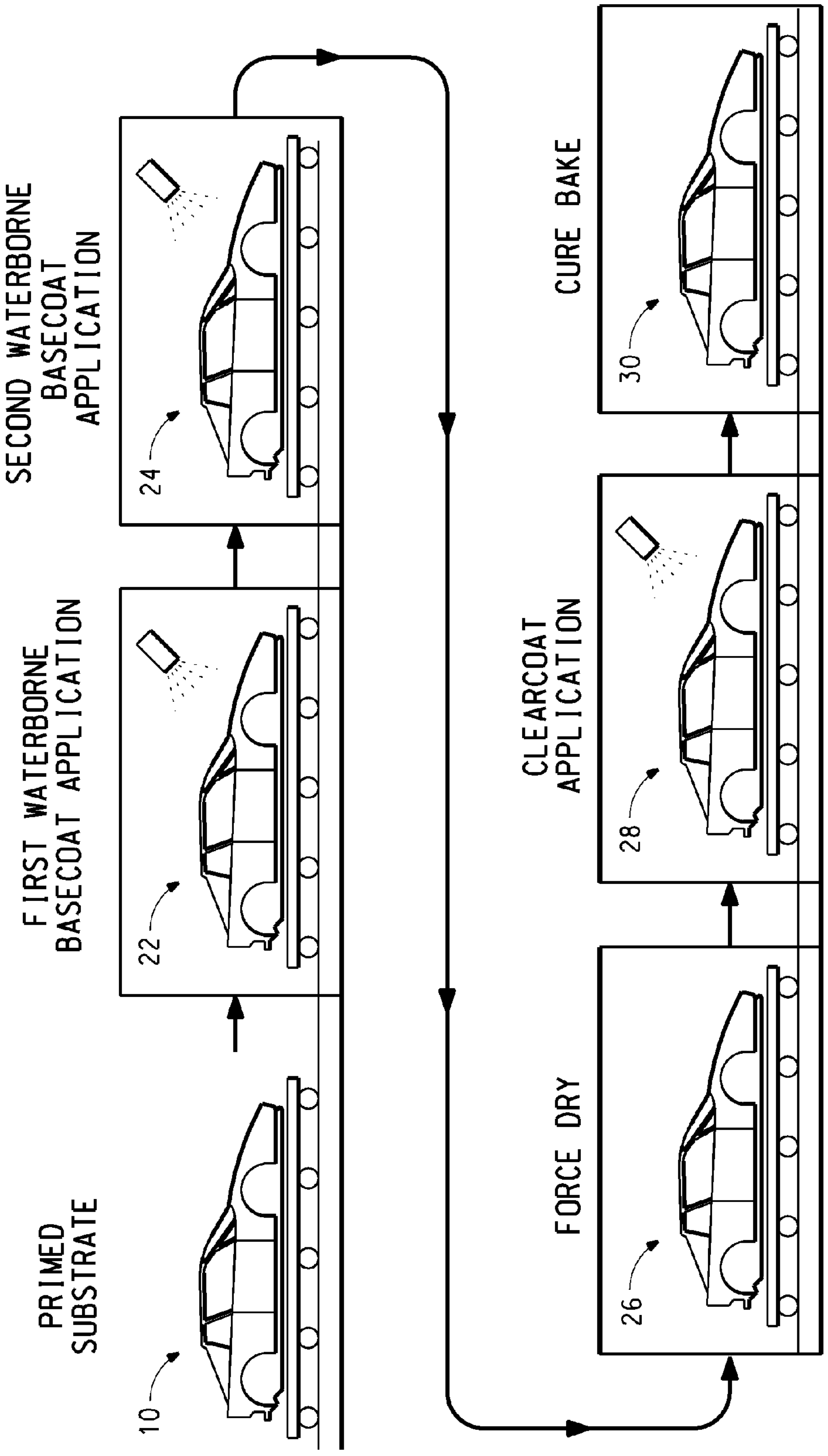
PRIMED SUBSTRATE
10
FIRST WATERBORNE BASECOAT APPLICATION
22
SECOND WATERBORNE BASECOAT APPLICATION
24
FORCE DRY
26
CLEARCOAT APPLICATION
28
CURE BAKE
30

METHOD OF PRODUCING A POLISHED METAL EFFECT FINISH ON A VEHICLE

This application is 35 U.S.C. 371 national stage entry from the International Application No. PCT/US08/84460, filed Nov. 24, 2008 which claims priority benefit from U.S. Provisional Application No. 61/004,555, filed Nov. 28, 2007, now abandoned.

FIELD OF THE INVENTION

The present invention relates to coating methods. More particularly, the invention relates to an improved method for producing highly reflective coatings on an automobile or truck body or part thereof.

BACKGROUND OF THE INVENTION

Automobile and truck bodies are treated with multilayer coating systems that enhance the aesthetic appearance of the vehicle and also provide protection from prolonged exposure to the environment or weathering. Basecoat/clearcoat finishes for automobiles and trucks have been commonly used for the past two decades. U.S. Pat. No. 4,728,543 and U.S. Pat. No. 3,639,347 disclose the application of a transparent protective clearcoat over a color coat or pigmented basecoat in a "wet on wet" application, i.e., the clearcoat is applied before the basecoat is completely cured. At the time of this application, it has become popular to produce finishes on vehicles that are either solid color, pearlescent color, or have a metallic sparkle. The metallic sparkle finishes are also described in the art as metallic effect finishes, which utilize a metallic flake pigment, such as aluminum flakes, in the pigmented basecoat layer to impart a glamorous, high gloss, metallic appearance.

As is well known in the art, in producing a finish of automotive quality on a substrate, multiple layers of coatings are generally used. A typical automobile steel panel or substrate has, for example, several layers of coatings. The substrate is typically first coated with an inorganic rust proofing zinc or iron phosphate layer over which is provided a corrosion resistant primer, which can be an electrocoated primer or a repair primer. A typical electrocoated primer, which is mainly used in original equipment manufacturing (OEM) applications, comprises epoxy polyester and various epoxy resins. Typically, a primer surfacer and/or sealer can be applied over the electrodeposited primer to provide a smooth surface for better appearance and to which the overlying layer or layers of basecoat will readily adhere. The cured primer layer can be sanded to remove any defects present such as, for example, dust particles in or on the primer or other imperfections.

In conventional practice, pigmented basecoat layers and/or "effect" basecoat layers are applied over the primer layer. Multiple basecoat layers can be applied depending upon the color and effect(s) that are desired in the finished product. The multiple layers can either be the same as each other or different from each other. In applications where two different basecoat layers are applied, such as for example when a metal flake pigment layer is applied over a solid color pigment layer, it is a requirement in the conventional art to use a forced drying or a curing step to rapidly dry or cure the first layer prior to application of the second layer. If the first basecoat layer is cured, the coated substrate is subjected to conditions such as, for example, curing ovens, that cause crosslinking of the film forming binder. When rapid drying is required in a painting process, it is conventional to use equipment such as blowers and/or heaters to remove at least 50% of a dispersant solvent from a first coating layer prior to application of a second coating layer having a different composition during the period of time allotted for painting a vehicle substrate. Simple evaporation under ambient conditions or reliance upon movement of air around a substrate as the substrate is moved along a paint process line is not adequate for rapid drying processes and, therefore, are not used conventionally where rapid drying processes—such as forced drying—are required.

Metal flake pigments come in a variety of shapes and sizes. Conventional effect finishes typically are relatively thick metal flake pigments that impart a sparkle to the finished substrate. Several pigment manufacturers produce thin metal flake pigments. It is possible to produce coatings using these thin metal flake pigments that have a polished or anodized metal look without the metallic sparkle imparted by thick metal flake pigments. However, thin metal flake pigments are difficult to use in a coating composition as they allow underlying surface defects, such as sanding scratches, to be readily visible in the finished substrate.

It is believed that the thin metal flake pigments are thin and flexible enough so as to conform to the topography of the underlying substrate. In this manner, during the solvent evaporation process, if thin metal flake pigments encounter a surface defect such as a sanding scratch, the flakes align and follow the topography of the defect. When the coating is dried and cured, the defect can be readily visible to the naked eye. In contrast, traditional metal flake pigments are thick enough so that they are able to lie flat on a substrate surface and bridge any sanding scratch defect without deforming. Such small scratches do not significantly affect a basecoating composition containing traditional metal flake pigments. Such traditional metal flake pigments typically have an average thickness of about 300 to about 500 nanometers whereas the thin metal flake pigments have an average thickness of only about 10 to 100 nanometers.

The desire for even more unique and attractive color effects has led the auto industry to find ways to create even brighter metallic effects than available today. Vapor metallized flake (VMF) pigments have been used in the basecoat layer to impart to the finish an extremely smooth and fine-textured bright metallic appearance similar to polished metal or an anodized metal with no perceptible "sparkle". This polished or anodized metal appearance differs from traditional metallic finishes in that there is a minimum of perceptible sparkle and the human eye cannot readily discern individual metallic flakes.

In conventional practice, a polished or anodized metal appearance (also conventionally known, and referred to herein, as the "polished metal effect") can be obtained using organic solvent-borne paints. However, use of such paints requires a large amount of surface preparation, and the paints are very difficult to produce. In a 2003 pre-print publication of Kansai Paint entitled "Super Metallic Silver Colors" (Y. Mizutami, Y. Nakao, and S. Nakamura) such a process is described where eight layers of paint and six bakes are required. This process would require substantial reconfiguration of a conventional paint line. European Patent Application 1,591,492 A1 discloses a coating method for forming a chrome-like coating effect, but requires that the effect layer be applied in multiple very thin coating layers. Such an application method is not useful in an OEM automotive facility without substantially slowing down the manufacturing process. U.S. Pat. No. 6,331,326 discloses a method for producing a plated metal effect on a substrate.

It would be desirable to eliminate multiple spray passes and baking steps in a process for manufacturing a vehicle having a polished metal appearance.

SUMMARY OF THE INVENTION

In one aspect, the present invention is a coating process useful for providing a polished metal appearance to a surface of a substrate, the process consisting essentially of the steps:

(a) applying to the surface of the substrate a solid color waterborne basecoat composition that is substantially free from thin metal flake pigments;

(b) applying over the coated substrate obtained from step (a) a pigmented waterborne basecoat composition comprising an effective amount of thin metal flake pigment, said thin metal flake pigment having an average thickness in the range of from 10 to 100 nanometers and having an average particle diameter in the range of from 5 to 30 micrometers;

(c) subjecting the coated substrate obtained in step (b) to a flash drying step;

(d) applying a clearcoat composition over the coated substrate obtained in step (c); and (e) curing the coatings applied in steps (a), (b), and (d) simultaneously in a single bake to obtain a coated substrate having a polished metal appearance;

wherein the first and second waterborne basecoat compositions comprise aqueous microgel and sheet silicate.

In another aspect, the present invention is a coating process for applying a multi-layer coating, wherein the process is carried out using painting equipment that consists essentially of two waterborne basecoat spray stations and one clearcoat spray station.

The method of this invention can be operated in a single pass continuous in-line paint application process or in stationary batch process such as a modular process.

The present invention eliminates the need for multiple bakes, while at the same time provides a waterborne finish that is of automotive quality and appearance, substantially free of sand scratch marks, and has smooth polished metal appearance with desired brightness, flop and with a minimum of sparkle metallic effect.

Various aspects of the present invention can be realized by careful and thoughtful modification of the claims using the details of the invention provided hereinbelow in any combination or manner to further limit what is already claimed. It is anticipated that any modification of what is claimed by what is disclosed is within the disclosed scope and available to the inventors to be claimed.

BRIEF DESCRIPTION OF THE DRAWINGS

FIG. 1 is a general flow diagram of one embodiment of the present invention to achieve a polished metal appearance.

DETAILED DESCRIPTION OF THE INVENTION

In the description of the present invention that follows below, the context is generally that of a process wherein an automotive substrate is coated on a continuously moving assembly line in a standard basecoat/clearcoat paint application line, such as shown in FIG. 1. One of ordinary skill in the coating art would understand that the process of the present invention could also be used in other types of continuous coating processes or processes conventionally known in the art, such as, for example, batch processes.

In one embodiment, the present invention is a process for applying a multilayer coating on a vehicle, wherein the coating provides a polished metal appearance to the coated vehicle. The present invention provides such an appearance on a vehicle that is substantially free from sand scratch marks, and thereby substantially reducing or eliminating altogether the manifestation of scratches and/or sanding defects that can be discerned at the outermost coating layer. By "substantially free of sand scratch marks" it is meant that a substrate coated according to the present invention is high enough in quality that no additional repair or retouching of the painted surface needs to be performed. It should be noted that the cured coating might have defects that need to be repaired, such as, for example, dust particles on or under the paint. However, small sanding scratches that may be present in the primer layer are generally not visible after application of the coating composition according to the present methods.

The terms "polished metal" or "anodized metal" appearance can be used interchangeably and as used herein describe a coating having a high flop value and a low texture and sparkle value. These values can be measured using a BYK-MAC 6-angle instrument, available from Byk-Gardner USA, Columbia, Md. This instrument can measure reflected light at several angles to determine the flop value, a "sparkle" value and a texture value that is termed "graininess" or "coarseness" value. Flop is determined by measuring the reflected light at several angles and applying those values to the following formula: $FLOP=(2.69))[L^*(15°)-L^*(110°)]^{1.11}/(L^*(45°))^{0.88})$, where $L^*(n)$ is the value of reflected light at an incidence angle of n.

In general, larger metallic flakes exhibit higher flop values and correspondingly high sparkle and graininess values. In contrast, the present method produces high flop values but low sparkle and graininess values. Such an appearance is also known in the art as a "polished metal effect".

The film-forming portion of the coating composition of this invention is referred to as the "binder" or "binder solids". The binder generally includes all the film-forming components that contribute to the solid organic portion of the cured composition. Generally, catalysts, pigments, and non-polymeric chemical additives such as stabilizers are not considered part of the binder solids. In this disclosure, the term "binder" or "binder solids" refers to the curable film-forming materials, the crosslinking agent and all other optional film-forming components, as are further described hereinbelow.

According to the practice of the present invention, a polished metal or anodized metal looking finish of automotive quality that is substantially free of sand scratch marks is produced in a single pass using conventional basecoat/clearcoat continuous paint application lines typical of conventional automobile painting.

Prior to treatment, according to the process of this invention, a substrate optionally can be primed or otherwise treated as may be conventional in the art. Preferably the vehicle body is pre-primed with a primer surfacer (also known as a primer sealer) layer and then sanded as needed to remove any defects, to a smooth finish as is conventional in the art.

Referring to FIG. 1, in the first step 22 of the process of this invention, a first waterborne basecoat is applied to the surface of the automotive substrate (10). The first waterborne basecoat is substantially free from thin metal flake pigments. The phrase "substantially free from" as used herein means that the first waterborne basecoat comprises less than 1 percent by weight of a thin metal flake, such that the effects of the thin metal flake are not discernable on coated surface. The first waterborne basecoat functions (a) to form a layer that fills any sanding scratch defects and (b) to provide a smooth surface on which the second waterborne basecoat can be applied. This allows the thin metal flake pigment present in the second waterborne basecoat to be oriented substantially parallel to the substrate and, after drying and curing the combined layers according to the present invention, provides the desired optical effect without allowing small sanding scratch defects that may be present in the primer layer to be seen.

The first waterborne basecoat composition can be applied to the surface of the substrate in this step by any suitable coating process well known to those skilled in the art. A preferred method to apply the first waterborne basecoat is using electrostatic or pneumatic spray equipment. The method and apparatus for applying the waterborne basecoat composition to the substrate is determined in part by the configuration and type of substrate material.

After application of a layer of the first waterborne basecoat composition, the process of the present invention includes a second step 24 of applying the second layer of waterborne basecoat composition containing thin metal flake pigment over the layer of first waterborne basecoat composition. The second waterborne basecoat composition can be applied to the surface of the substrate in this step by any suitable coating process known to those skilled in the art. A preferred method of applying the second waterborne basecoat is using pneumatic or electrostatic spray equipment. In the practice of the present invention, the second waterborne basecoat composition can be applied within about 10 to 300 seconds of the first waterborne basecoat application, preferably within about 1 to 4 minutes of application.

The process of the present invention can take advantage of two conventional basecoat zones 22 and 24 in a typical basecoat/clearcoat painting line without the need to reconfigure the line. In FIG. 1, basecoat application zone 22 and basecoat application zone 24 can be individual spray booths or can be the same spray booth. In some existing OEM automotive basecoat painting lines, basecoat zones 22 and 24 are the same spray booth. Two separate sets of spray guns are used to apply the layers of the first and second waterborne basecoat compositions and in many cases, the application of the second waterborne basecoat (onto the first waterborne basecoat) begins prior to the complete application of the first waterborne basecoat to the entire substrate.

In the practice of the present invention, the second waterborne basecoat is applied over the first waterborne basecoat before the first waterborne basecoat is dry. In a preferred embodiment, the second waterborne basecoat containing the thin metal flake pigment can be applied to the first waterborne basecoat in such a manner that at least 50 percent, preferably at least 65 percent and more preferably, at least 80 percent by weight of the carrier liquid of the first waterborne basecoat is still present when the second waterborne basecoat is applied. In the practice of the present invention a forced drying step or intermediate flash step before the application of the second waterborne basecoat composition is optional. Forced drying, as one of ordinary skill in the art would know, requires utilizing equipment such as blowers and/or heaters to remove solvent at a faster rate than would occur under ambient conditions, or with ambient (unforced) air flow such as, for example, the normal airflow resulting from the movement of a substrate through space on a paint process line. It can be desirable in the practice of the present invention to eliminate process steps that are not required, and thereby improve efficiency and reduce costs associated with such steps. If no forced drying step or flash step is practiced it is expected that the solvent content of the first waterborne basecoat would not be reduced substantially—that is, not greater than 5 wt % loss of solvent, compared with the weight of the applied first waterborne basecoat—prior to applying the second waterborne basecoat. Application of the second waterborne basecoat composition can be done at essentially the same temperature, humidity, and airflow conditions as used to apply the first waterborne basecoat composition.

After application of the second waterborne basecoat composition, the process of the present invention includes a third step 26 of subjecting the combined waterborne basecoat layers to a forced drying or flash step to volatilize at least a portion of the volatile materials from the liquid coating compositions and set, but not initiate curing or crosslinking of, the basecoats on the substrate. By set, it is meant that the applied basecoat is dried sufficiently that it is not disturbed or marred (waved or rippled) by air currents that may blow past the surface. The flash step can be conducted in heated and/or dehydrated air, such as, for example, using infra-red radiation and convection drying. If the air is heated, it can be heated to a temperature in the range of from about 60° C. to 80° C. The volatilization or evaporation of volatiles from the basecoat can be carried out in open air, but is preferably carried out in a flash chamber (FIG. 1) in which heated and/or dehydrated air is circulated at low velocity to minimize airborne particle contamination. A typical flash chamber has blowers or fans positioned at the top and sides of the chamber so that the circulated air is directed in a manner that is substantially perpendicular to the surface of the substrate. The automobile body can be moved through the flash chamber in an assembly-line manner at a rate that permits the volatilization of the applied basecoat compositions as discussed above. The rate at which the automobile body is moved through the flash chamber depends in part upon the length and configuration of the flash chamber. An intermediate flash step can take from 30 seconds to 10 minutes. Preferably this step can take from about 2-5 minutes, as in a conventional painting process.

Following application of the two basecoats to the surface of the automobile, the body is dried sufficiently to enable application of the clearcoat composition such that the quality of the finish will not be affected adversely by further drying and/or curing of the basecoat. Preferably, the basecoats, after application to the surface of the substrate, and having been subjected to the flash step, form a multilayer film that is substantially uncrosslinked. During the flash step, the applied basecoat compositions must be sufficiently dried so that remaining water vapor does not evolve to create defects in the layers of basecoat or clearcoat composition during the baking and curing of the applied layers.

Referring again to FIG. 1, the process of the present invention comprises a next step 28 of applying a liquid (solvent-borne or waterborne) or powder clear clearcoat composition over the applied basecoat layers. The clearcoat can be applied by any of the method known to those of ordinary skill in the art. A liquid clearcoat can be applied over a basecoat by means of a wet-on-wet application, i.e., the clearcoat can be applied to the basecoat without curing or completely drying the basecoat. The clearcoat is preferably applied over partially layers of basecoat composition that have been flashed, that is, partially dried. For the purposes of the present invention, this is referred to herein as a "wet-on-wet" process because the basecoat is not completely dried or cured. Although less preferred, the applied basecoat compositions can be cured, if desired, before the clearcoat is applied.

According to the present invention, the first and second waterborne basecoat compositions and the clearcoat compositions described above can be applied by conventional techniques such as spraying, electrostatic spraying, high rotational electrostatic bells, and the like. The preferred techniques for applying all three coatings are air atomized (pneumatic) spraying with or without electrostatic enhancement, and high-speed rotational electrostatic bells, since these techniques are typically employed in a continuous paint application process.

Following the application of the clearcoat, the process of the present invention preferably comprises a curing (i.e., baking) step 30 in which the coated substrate is heated for a predetermined time period to allow simultaneous curing of the basecoats and clearcoat. The composite coating composition is baked preferably at 60-150° C. for about 15-45 minutes to form a cured finish on the substrate. As used herein, "cured" means that the crosslinkable components of the coatings are substantially crosslinked. By the term "substantially crosslinked", it is meant that most of the crosslinking has occurred, although further crosslinking may occur over time.

The process of the invention can optionally include a cooling step (not shown) after the curing step to cool the composite finish to ambient temperatures before the vehicle is further worked on during its manufacture.

The first waterborne basecoat functions to fill in defects, such as the sanding defects present in the primer surfacer layer, and provide a smooth finish over which a second waterborne basecoat layer containing an effective amount of thin metal flakes can be applied. Preferably, the first basecoat is either a non-transparent solid color (pigmented) basecoat or an unpigmented basecoat.

The term "non-transparent" as used herein means that the contrast between the black and white fields of a black and white chart coated with the coating composition is no longer visually discernible. ISO 6504-3:2006 (E), method B is used to determine the dry film thickness of a coating composition that is applied in a wedge shape to a black and white chart at the point of complete hiding.

The first waterborne basecoat composition employed in the present invention is a waterborne basecoat composition, preferably a solid color pigmented or an unpigmented waterborne basecoat composition, more preferably a solid color black waterborne basecoat, that is opaque and can be applied at complete hiding. Other non-transparent colored compositions can also be used, although black-pigmented compositions are preferred.

The first waterborne basecoat composition is preferably a crosslinkable composition comprising a film-forming binder, volatile material, and optionally pigment. The film-forming binder must contain at least one water-compatible aqueous microgel, at least one crosslinking agent such as an amino resin and a sheet silicate. The film-forming binder also preferably contains at least one other polyol polymer.

The aqueous microgels suitable for use in this invention may be composed of various types of crosslinked polymers. Of particular interest for the purposes of this invention are crosslinked acrylic microgel particles. Preparation of such acrylic microgels may be carried out by methods that are well known and routinely practiced by those of ordinary skill in the art. Typically, the microgels are acrylic addition polymers mainly derived from one or more alkyl acrylates or methacrylates, optionally together with other ethylenically unsaturated copolymerizable monomers like styrene and vinyl esters. Suitable alkyl acrylates or methacrylates include, without limitation, alkyl acrylates and methacrylates each having 1-18 carbon atoms in the alkyl group. Since the microgel is required to be formed with internal crosslinking, there may be included in the monomers from which the microgel is derived a minor proportion of a monomer which is polyfunctional with respect to the polymerization reaction, such as ethylene glycol dimethacrylate, allyl methacrylate or divinylbenzene.

Alternatively, there may be included in the monomers minor proportions of two other monomers carrying pairs of functional groups which can be caused to react with one another either during or after polymerization, such as epoxy and carboxyl (as for example, in glycidyl methacrylate and methacrylic acid), anhydride and hydroxyl, or isocyanate and hydroxyl. There also is preferably included in the monomers from which the microgel is derived minor amounts of a hydroxy containing monomer for crosslinking purposes after application of the composition to the substrate from the following group: hydroxy alkyl acrylates or methacrylates, or any mixtures of other ethylenically unsaturated hydroxy.

Acid functional monomers such as acrylic acid or methacrylic acid are also preferably included in the monomer mix to ionically stabilize the microgels in the aqueous dispersion medium by converting such groups to a suitable salt by reaction with a base, such as dimethylaminoethanol, dissolved in the aqueous medium. Alternatively, the required stability in the aqueous medium can be achieved by using an acrylate or methacrylate monomer containing basic groups, for example, N,N-dimethylaminoethyl methacrylate which is neutralized with a suitable acid, such as lactic acid. Stability in aqueous medium can also be achieved through the use of surfactants or macromonomers that contain water-soluble nonionic stabilizers such as materials that contain polyethylene glycol structures.

Suitable acrylic microgels that can be used to form the waterborne basecoat composition include crosslinked polymer microparticle aqueous dispersions such as disclosed in Backhouse U.S. Pat. No. 4,403,003 issued Sep. 6, 1983 and Backhouse U.S. Pat. No. 4,539,363 issued Sep. 3, 1985. The microgel preferably contains appropriate functional groups, such as hydroxy groups, whereby they can become crosslinked, after application of the composition to the substrate by means of a crosslinking agent, e.g., the amino resin.

By "aqueous carrier", it is meant either water alone or water mixed with a water-miscible organic co-solvent such as an alcohol. The crosslinked microgel particles so produced are provided in colloidal dimensions. The microgel particles that are particularly useful in this invention generally have a colloidal size from about 80 to 400 nanometers, in diameter, preferably from about 90 to 200 nanometers.

In addition to the aqueous microgel, the first and second waterborne basecoat compositions can each individually include other film-forming polymers, such as polyols. Suitable polyols useful for preparing the waterborne basecoat composition include water-compatible acrylic, polyester, polyurethane, polyether, or other polyol having a hydroxyl number of 50-200, as are conventional in the art. Additional water-compatible film-forming and/or crosslinking polymers may be included in the basecoat employed in the present invention. Examples include water-compatible acrylics, polyurethane, epoxies, or mixtures thereof.

Alternatively or in addition to the film-forming polymers mentioned above, film-forming filler materials such as oligomeric polyether glycols of low volatility, for example, low molecular weight polypropylene and/or polyethylene glycol, can be used to fill the voids formed by the microgel particles upon drying and to improve the physical properties of the resulting film or finish. These oligomeric substances can be converted to high molecular weight polymer, after application of the basecoat composition, by linking them through their hydroxyl groups or other groups that are reactive with the crosslinking agent.

Suitable crosslinking agents include aminoplast resins that are soluble or partially soluble in the aqueous medium of the composition, such as melamine-formaldehyde condensates and in particular alkylated (e.g., methylated, butylated) melamine-formaldehyde condensates. Other contemplated crosslinking agents are alkylated urea formaldehyde condensates, benzoguanamine formaldehyde condensates and blocked polyisocyanates or compatible mixtures of any of the forgoing.

A useful first waterborne basecoat composition comprises aqueous microgel in an amount of from about 20-70% by weight of binder solids, preferably 45-65% by weight, in addition to coloring pigments. Suitable aqueous microgels include but are not limited to the crosslinked acrylic micro-particle aqueous dispersions disclosed in U.S. Pat. No. 4,403,003, water-soluble or partially water-soluble aminoplast resin, preferably a methylated melamine formaldehyde, from 10-35%, preferably 15-25%; water dispersible polyester polyol resin from about 0-30%; polyurethane polyol aqueous dispersion from 0-35%, preferably 5-15%; water soluble polyether filler from 0-15%; water-soluble acid catalyst from about 0-2%, such as but not limited to a volatile amine blocked sulfonic acid catalyst, to promote melamine or other crosslinking reaction. The first waterborne basecoat composition also includes 0.1-1.6%, preferably 0.2-1%, based on the weight of the total composition, sheet silicate particle, such as those disclosed in Berg et al. U.S. Pat. No. 5,198,490 issued Mar. 30, 1993, to help give the desired holdout or resistance to strike-in and intermixing.

The overall solids content of the first waterborne basecoat composition can range from about 10 to 50% by weight of the total composition. Preferably, the overall solids content of the first waterborne basecoat can range from about 20 to 40% by weight of the total composition.

A variety of pigments and/or metal flake pigments or other effect pigments can be employed in the first waterborne basecoat composition, as would be apparent to those skilled in the art. In a preferred embodiment, the first waterborne basecoat composition is a "straight-shade" or "solid color" coating that has no visible flop or two tone metallic effect and primarily contains colored pigments other than flake.

Colored pigments useful in the practice of the present invention include, for example, metal oxides such as titanium dioxide, zinc oxide, iron oxides of various colors; carbon black; filler pigments such as talc, china clay, barytes, carbonates, silicates; and organic colored pigments such as quinacridones, phthalocyanines, perylenes, azo pigments, indanthrone blues, carbazoles such as carbazole violet, isoindolinones, isoindolones, thioindigo reds, benzimidazolinones, diketo-pyrrolo-pyrroles (DPP).

Minor amounts of effect pigments such as aluminum flakes, copper bronze flakes, pearlescent flakes, and the like, and optional other effect pigments, holographic flakes, glass spheres, glass flakes, other non-flake effect pigments including micro titanium dioxide pigments and GRAPHITAN® pigments, and higher degree effect pigments including, for instance, CHROMAFLAIR®, VARIOCHROME®, and HELICONE® pigments, can be optionally included in the first waterborne basecoat composition to impart the desired color effect and hiding. The metal flake pigments optionally used in the first waterborne basecoat are distinguished from the thin metal flake pigments of the second waterborne basecoat composition. Metal flakes of the first basecoat have an average particle thickness in the range of from 300 to 500 nanometers and average particle diameters in the range of from 5 to 60 micrometers. They are significantly thicker than the thin metal flake pigments of the second waterborne coating.

It can be optional to include agents that inhibit the reaction of the traditional metal flake pigments with water. Typical inhibitors are phosphated organic materials such as phosphoric acid and other materials as described in U.S. Pat. No. 4,675,358.

The specific pigment to binder ratio of the first waterborne basecoat can vary widely so long as it provides the requisite hiding at the desired film thickness and application solids. The pigments can be introduced into either the first or second waterborne basecoat compositions by forming a mill base or pigment dispersion with any of the aforementioned polymers used in the coating compositions or with another compatible polymer or dispersant by conventional techniques, such as high speed mixing, media milling, sand grinding, ball milling, attritor grinding or two/three roll milling. It is known conventionally that milling techniques are not applicable for metal flake pigments. It is therefore conventional that mixing and slurry techniques are used to disperse flake pigments. The pigment dispersion can be blended with the other constituents used in the coating compositions.

The first and second waterborne basecoat compositions are formulated to have acceptable hold-out or resistance to intermixing between the basecoats within about 10 to 300 seconds after application at ambient conditions between coats, preferably within 1 to 4 minutes under ambient conditions. Ambient conditions mean the environmental conditions in a typical painting facility. Typical ambient conditions are: a temperature in the range of from 15° C. to about 35° C.; a relative humidity in the range of from 5 percent to 90 percent; and, for a continuous paint line, a line speed in the range of from about 2 meters/minute to about 11 meters/minute. Preferably, the coating materials described herein are formulated so that they can be applied in conditions ranging from 18° C. to 28° C. and a relative humidity of 50 percent to 70 percent. An additional step of flashing a portion of the aqueous carrier from the first waterborne basecoat layer before applying the second waterborne basecoat composition is not required nor is such a step desirable. In a continuous painting facility, that is, a painting facility utilizing a continuously moving paint line using a "wet on wet" process, it is believed that no substantial evaporation of the solvent from the first waterborne basecoat occurs during the time between the completion of the first waterborne basecoat and the start of the application of the second waterborne basecoat. The second waterborne basecoat composition can be applied over the first layer under the same or similar spraybooth conditions as used when applying the first waterborne basecoats without sacrificing good control of the orientation of the thin metal flake pigments, and without detracting from the desirable appearance (i.e. a minimum of perceptible sparkle, high brightness, large flop value, polished or anodized metal appearance) of the overall finish.

The first waterborne basecoat can be applied at such a rate as to achieve a dry film thickness in the range of from 5 to 40 microns, preferably in the range of from 15 to 30 microns. The second waterborne basecoat can be applied so as to achieve a dry film thickness in the range of from 2 to 10 microns, preferably in the range of from 2 to 4 microns. To achieve a thin dry film of the second waterborne basecoat, the solids content of the second waterborne basecoat can be kept low relative to that of the solids content of the first waterborne basecoat. Typically, the solids content of the second waterborne basecoat can be in the range of from about 3% to about 30% by weight of the total composition. Preferably, the solids content of the second waterborne basecoat can be in the range of from 5% to 15%, by weight of the total composition.

The second waterborne basecoat composition employed in this invention provides the polished metal effect and is a differently pigmented composition that is formulated to be, like the first waterborne basecoat composition, non-transparent (opaque) so that it can be applied at complete hiding. The second waterborne basecoat composition comprises an effective amount of thin metal flake pigment to impart the desired polished metal effect. An effective amount of thin metal flake pigment, for the purposes of the present invention, is the amount of thin metal flake contained in a binder composition in a thin metal flake to binder ratio of from 1/100 up to 100/100, preferably from 3/100 up to 50/100, and most preferably from 10/100 up to 40/100.

The term "thin metal flake pigment" as used herein means a metal particle having an average particle thickness in the range of from about 10 to 100 nanometers and an average particle diameter in the range of from about 5 to 30 micrometers. Preferably, the thin metal flake pigments have an average thickness in the range of from about 15 to 40 nanometers and an average particle diameter in the range of from about 8 to 20 micrometers. Such thin metal flake pigments have an aspect ratio (the ratio of the flake diameter to the flake thickness) that is very high (in the hundreds rather than traditional flake pigments in the tens). These thin metal flake pigments can be produced by coating a very thin layer of metal vapor onto pretreated polyester film in a vacuum chamber and then solvent stripping the deposited metal layer from the carrier film. Other methods for producing these thin metal flake pigments include, for example, physical vapor deposition, chemical vapor deposition, electrolysis, milling and sputtering processes. The thin metal flake pigments may be unpassivated or passivated. Passivated types are, for example, phosphated, chromated or coated with a silicon-oxygen network. Passivated types are preferably used. Such thin metal flake pigments are commercially available in passivated and unpassivated forms as pigment preparations under the names HYDROSHINE® and METALURE®, both available from Altana/Eckart, Furth, Germany; METASHEEN® available from Ciba, Basel, Switzerland; DECOMET® available from Schlenk, Roth, Germany and STARBRITE®, available from Silberline, Tamaqua, Pa.

The second waterborne basecoat composition may optionally also contain one or more other traditional flake pigments such as standard aluminum flake pigments and/or flake pigments. It may also optionally contain other colored pigments to give the desired color effect, such as any of those listed above. In one embodiment, the second waterborne basecoat is a silver color basecoat.

Preferred second waterborne basecoat compositions contain film forming binders that are similar to the first basecoat composition and include an aqueous microgel, such as but not limited to the crosslinked aqueous microgel dispersions disclosed in aforementioned U.S. Pat. No. 4,403,003, optional polyol polymer, a crosslinking agent, such as an amino resin, an effective amount of thin metal flake pigment and sheet silicate. Any of the microgels, polyols, and crosslinking resins described as useful in the first basecoat can be used in the second waterborne basecoat composition.

One useful second waterborne basecoat composition, in addition to the thin metal flake pigments and optionally other pigments, comprises by weight of binder solids, aqueous microgel from about 20-70%, preferably 45-65%, water-soluble or partially water-soluble aminoplast resin, preferably a methylated melamine formaldehyde, from about 10-35%, preferably 15-25%, water dispersible polyester polyol resin from about 0-30%, polyurethane polyol aqueous dispersion from about 0-35%, preferably 15-25%, water-soluble polyether filler from 0-10%, blocked acid catalyst from about 0-2%, such as but not limited to amine blocked sulfonic acid catalyst, to promote melamine or other crosslinking reaction. The composition also includes 0.1-1.6%, preferably 0.3-1%, based on the weight of the total composition, sheet silicate particle to help give the desired holdout or resistance to strike-in and intermixing.

In addition to an effective amount of thin metal flake pigment, the second waterborne basecoat composition can optionally include other pigments such as color providing pigments or other flake effect pigments.

The pigments can be introduced into the second waterborne basecoat composition by first forming a mill base or pigment dispersion with any of the aforementioned polymers used in the coating composition or with another compatible polymer or dispersant by conventional techniques, such as mixing/slurrying (i.e., for flakes), high speed mixing, media milling, sand grinding, ball milling, attritor grinding or two/three roll milling. Milling techniques may not be applicable for metal flake pigments. Mixing and slurry techniques can be used to disperse flake pigments. The pigment dispersion can be blended with the other constituents used in the coating composition.

Both first and second waterborne basecoat compositions employed in the present invention may also include other conventional formulation additives such as wetting aids, surfactants, defoamers, UV fortifiers, and rheology control agents, such as fumed silica, alkali swellable emulsions, associative thickeners, or water compatible cellulosics. Both first and second waterborne basecoat compositions employed in this invention also include volatile materials such as water alone or water and a mixture of conventional organic solvents and diluents, to disperse and/or dilute the above mentioned polymers and facilitate formulation and spray application. Typical organic co-solvents and diluents include hexyl CELLOSOLVE®, toluene, xylene, butyl acetate, acetone, methyl isobutyl ketone, methyl ethyl ketone, methanol, isopropanol, butanol, butoxyethanol, hexane, acetone, ethylene glycol, monoethyl ether, VM and P naptha, mineral spirits, heptane and other aliphatic, cycloaliphatic, aromatic hydrocarbons, esters, ethers and ketones and the like. However, in a typical basecoat for this invention, water is used as the major diluent. Amines such as alkanolamine can also be used as a diluent.

It is essential in the practice of the present process that both the first and second waterborne basecoats include the required amounts of both aqueous microgel and sheet silicate. The combination of the two in each of the basecoat compositions functions to provide coating compositions that once applied to a substrate, have the required resistance to intermixing. This allows the first waterborne basecoat to provide a flat and smooth surface on which to apply the second waterborne basecoat containing the thin metal flake pigments and prevent intermixing of the two layers that would destroy the desired polished metal effect.

The nature of the clearcoat composition employed in the process of the present invention is not critical. Any of a wide variety of commercially available automotive clearcoat compositions may be employed in the present invention including standard solventborne, waterborne, or powdered clears. High solids solventborne clearcoats that have low VOC (volatile organic content) and meet current pollution regulations are generally preferred. Typically useful solventborne clearcoats include but are not limited to 2K (two-component) systems of polyol polymers crosslinked with isocyanate and 1K systems of acrylic polyol crosslinked with melamine or 1K acrylosilane systems in combination with polyol and melamine. Epoxy-acid systems can also be used. Suitable 1K solventborne acrylosilane clearcoat systems that can be used in the process of the present invention are known and disclosed in U.S. Pat. No. 5,162,426. Suitable 1K solventborne acrylic/melamine clearcoat systems are disclosed in U.S. Pat. No. 4,591,533. Matte clearcoat finishes can be used as well to provide a delustered effect to the applied coating compositions. Matte effect clearcoats are commercially available. For example, Matte Clear HHC-5300® can be obtained from DuPont, Wilmington, Del.

The above described multilayer coating composition can be used to provide automobiles and trucks with a polished metal-like or anodized metal-like exterior finish having an attractive aesthetic appearance, including high gloss and DOI (distinctness of image), even on prolonged exposure to the environment and weathering. Matte finish clearcoats can provide the same effect, without the high gloss and DOI traits of a gloss clearcoat.

Useful substrates that can be coated according to the process of the present invention include a variety of metallic and non-metallic substrates such as plastic substrates, and combinations thereof. Useful metallic substrates that can be coated according to the process of the present invention include unprimed substrates or previously painted substrates, cold rolled steel, phosphatized steel, and steel coated with conventional primers by electrodeposition. Useful plastic materials include polyester reinforced fiberglass, reaction-injection molded urethanes, partially crystalline polyamides, and the like or mixtures thereof and their associated primers.

Preferably, the substrates are used as components to fabricate automotive vehicles, including but not limited to automobiles, trucks, and tractors. The substrates can have any shape, but are usually in the form of automotive body components such as bodies, hoods, doors, fenders, bumpers and/or trim for automotive vehicles. The invention is most useful in the context of coating automotive bodies and components thereof traveling in continuous movement along an automotive assembly line.

While the current invention has been described in terms of application in an automotive assembly plant, the invention can also be applied in an automotive refinish body shop. In this manner, a damaged automobile finish can be repaired or an entire vehicle can be painted with the described coating compositions.

Various other modifications, alterations, additions or substitutions of the components of the processes and compositions of this invention will be apparent to those skilled in the art without departing from the spirit and scope of this invention. This invention is not limited by the illustrative embodiments set forth herein, but rather is defined by the following claims.

EXAMPLES

Unless otherwise noted, all components of the following examples are believed to be available from the Aldrich Chemical Company, Milwaukee, Wis. The following other components were used in the examples.

CYMEL® 303 melamine and DAOTAN® VTW 1236 aqueous aliphatic polyurethane dispersion are available from Cytec Industries, West Patterson, N.J.

SOLSPERSE® 200000 dispersant is available from the Lubrizol Corporation, Wickliffe, Ohio.

SURFYNOL® 104 nonionic surfactant is available from Air Products and Chemicals, Inc., Allentown, Pa.

PALIOGEN® Red L 3885 pigment is available from the BASF Corporation, Florham Park, N.J.

CARBON BLACK FW 200® pigment is available from Evonik Industries, Essen, Germany.

LAPONITE® RD sheet silicate is available from Southern Clay Products, Gonzales, Tex.

ACRYSOL® ASE 60 anionic thickener is available from Rohm and Haas (now part of the Dow Chemical Company, Midland Mich.), Philadelphia, Pa.

HYDROSHINE® WS-3001 metal effect pigment is available from Altana/Eckart, Fürth, Germany.

Preparation of Black Pigment Dispersion

The following pigment slurry was prepared with 35.5 grams (g) of de-ionized water, 10.0 g of a 30% non-volatile hydroxy functional aqueous acrylic microgel, 20.0 g butoxyethanol, 15.0 g CYMEL® 303, 5.0 g SOLSPERSE® 20000 and 7.0 g of 10% aqueous dimethylethanol amine solution and 0.5 g SURFYNOL® 104. The above components were mixed together, 7.0 g of CARBON BLACK FW 200® pigment was added and the resulting slurry was pre-dispersed using a Cowles blade. The mixture was then ground in a horizontal beadmill until the desired particle size of less than 0.5 micron was achieved.

Preparation of Red Pigment Dispersion

The following pigment slurry was prepared with 46.3 g of de-ionized water, 15.0 g of a 30% non-volatile hydroxy functional aqueous acrylic microgel, 20.0 g butoxyethanol, 8.0 g CYMEL® 303, 2.0 g SOLSPERSE® 20000, 0.2 g of 10% aqueous dimethylethanol amine solution and 0.5 g SURFYNOL® 104. The above components were mixed together and 8.0 g of PALIOGEN® Red L 3885 pigment was added and the resulting slurry was pre-dispersed using a Cowles blade. The mixture was then ground in a horizontal beadmill until the desired particle size of less than 0.5 micron was achieved.

Preparation of Rheology Base

A homogeneous blend was prepared by mixing together and stirring 47.5 g of a 30% non-volatile hydroxy functional aqueous acrylic microgel, 2.0 g of butoxyethanol and 0.5 g of SURFYNOL® 104. Following this, 50.0 g of 3% LAPONITE® RD in de-ionized water was added under stirring and homogenized and dispersed using a horizontal beadmill.

Preparation of First Waterborne Black Basecoat Composition

A first waterborne black basecoat composition was prepared by mixing together the following constituents under constant agitation in the order stated: 26.8 pbw of a 30% non-volatile hydroxy functional aqueous acrylic microgel, 16.2 pbw of black pigment dispersion, 5.8 pbw of CYMEL® 303, 13.8 pbw of rheology base, 1.0 pbw of SURFYNOL® 104, and 2.0 pbw of butoxyethanol. The viscosity of the basecoat composition was adjusted to within the desired range of (2000-4000 mPa·s at shear rate D=1 $sec^{-1}$), and the pH was adjusted to within the desired range of (8.2-8.8) using 34.4 pbw of a combination of (i) de-ionized water, (ii) a 10% (by non-volatiles (nv)) pre-neutralized solution of ACRYSOL® ASE 60 in de-ionized water and (iii) a 10% aqueous dimethylethanol amine solution in de-ionized water.

Preparation of Comparative First Waterborne Black Basecoat Composition A

This example shows the preparation of a first waterborne basecoat composition without the addition of sheet silicate.

A waterborne black basecoat composition was prepared by mixing together the following constituents under constant agitation in the order stated: 36.0 pbw of a 30% non-volatile hydroxy functional aqueous acrylic microgel, 16.2 pbw of black pigment dispersion, 5.8 pbw of CYMEL® 303, 1.0 pbw of SURFYNOL® 104, and 2.0 pbw of butoxyethanol. The viscosity of the basecoat composition was adjusted to within the desired range of (2000-4000 mPa·s at shear rate D=1 $sec^{-1}$), and the pH was adjusted to within the desired range of (8.2-8.8) using 39.0 pbw of a combination of (i) de-ionized water, (ii) a 10% nv pre-neutralized solution of ACRYSOL® ASE 60 in de-ionized water and (iii) a 10% aqueous dimethylethanol amine solution in de-ionized water.

Preparation of Comparative First Waterborne Black Basecoat Composition B

This example shows the preparation of a basecoat composition without the addition of the aqueous acrylic microgel.

The preparation of the first waterborne black basecoat composition was repeated with the difference that the entire portion of the 30% non-volatile hydroxy functional aqueous acrylic microgel (including any aqueous acrylic microgel contained in the premixes used) was replaced by an aqueous polyurethane dispersion DAOTAN® VTW 1236. This replacement was performed according to an 1:1 replacement of binder solids. The viscosity of the basecoat composition was adjusted to within the desired range of (2000-4000 mPa·s at shear rate D=1 $sec^{-1}$), and the pH was adjusted to within the desired range of (8.2-8.8) using a combination of (i) de-ionized water, (ii) a 10% nv pre-neutralized solution of ACRYSOL® ASE 60 in de-ionized water and (iii) a 10% aqueous dimethylethanol amine solution in de-ionized water.

Preparation of Second Waterborne Silver Basecoat Composition

A waterborne silver color basecoating composition was prepared by mixing together the following constituents under constant agitation in the order stated: 13.0 pbw of a 30% non-volatile hydroxy functional aqueous acrylic microgel, 12.4 pbw of HYDROSHINE® WS-3001, 3.4 pbw of CYMEL® 303, 4.2 pbw of Rheology base, 1.0 pbw of butoxyethanol, and 1.0 pbw of SURFYNOL® 104. The viscosity of the basecoat composition was adjusted to within the desired range of (2000-4000 mPa·s at shear rate D=1 $sec^{-1}$), and the pH was adjusted to within the desired range of (8.2-8.8) using 65.0 pbw of a combination of (i) de-ionized water, (ii) a 10% nv pre-neutralized solution of ACRYSOL® ASE 60 in de-ionized water and (iii) a 10% aqueous dimethylethanol amine solution in de-ionized water.

Preparation of Comparative Second Waterborne Silver Basecoat Composition C

This examples shows the preparation of a basecoat composition without the addition of sheet silicate.

A waterborne silver color basecoating composition was prepared by mixing together the following constituents under constant agitation in the order stated: 15.9 pbw of a 30% non-volatile hydroxy functional aqueous acrylic microgel, 11.7 pbw of HYDROSHINE® WS-3001, 3.4 pbw of CYMEL® 303, 1.0 pbw of butoxyethanol, and 1.0 pbw of SURFYNOL® 104. The viscosity of the basecoat composition was adjusted to within the desired range of (2000-4000 mPa·s at shear rate D=1 $sec^{-1}$), and the pH was adjusted to within the desired range of (8.2-8.8) using 67.0 pbw of a combination of (i) de-ionized water, (ii) a 10% nv pre-neutralized solution of ACRYSOL® ASE 60 in de-ionized water and (iii) a 10% aqueous dimethylethanol amine solution in de-ionized water.

Preparation of Comparative Second Waterborne Silver Basecoat

Composition D

This example shows the preparation of a basecoat composition without the addition of the aqueous acrylic microgel.

The preparation of the second waterborne silver basecoat composition was repeated with the difference that the entire portion of the 30% non-volatile hydroxy functional aqueous acrylic microgel (including any aqueous acrylic microgel contained in the premixes used) was replaced by an aqueous polyurethane dispersion DAOTAN® VTW 1236. This replacement was performed according to an 1:1 replacement of binder solids. The viscosity of the basecoat composition was adjusted to within the desired range of (2000-4000 mPa·s at shear rate D=1 $sec^{-1}$), and the pH was adjusted to within the desired range of (8.2-8.8) using a combination of (i) de-ionized water, (ii) a 10% nv pre-neutralized solution of ACRYSOL® ASE 60 in de-ionized water and (iii) a 10% aqueous dimethylethanol amine solution in de-ionized water.

Preparation of Second Waterborne Silver-Red Basecoat Composition.

A waterborne silver-red color shade basecoating composition was prepared by mixing together the following constituents under constant agitation in the order stated: 10.3 pbw of a 30% non-volatile hydroxy functional aqueous acrylic microgel, 7.5 pbw of HYDROSHINE® WS-3001, 2.5 pbw of CYMEL® 303, 9.3 pbw of red pigment dispersion, 4.0 pbw of rheology base, 1.0 pbw of butoxyethanol and 1.0 pbw. SURFYNOL® 104. The viscosity of the basecoat composition was adjusted to within the desired range of (2000-4000 mPa·s at shear rate D=1 $sec^{-1}$), and the pH was adjusted to within the desired range of (8.2-8.8) using 64.4 pbw of a combination of (i) de-ionized water, (ii) a 10% nv pre-neutralized solution of ACRYSOL® ASE 60 in de-ionized water and (iii) a 10% aqueous dimethylethanol amine solution in de-ionized water.

Solventborne Clearcoat Composition

The clearcoat composition used for the examples was a collision baking clear, commercially available from Du Pont Performance Coatings (Standox), Christbusch 25, D-42285 Wuppertal, Germany, prepared by mixing STANDOCRYL® 2K-HS Clearcoat, 020-82497, with STANDOX® 2K-HS Hardener, 020-82403, in a 2:1 volume ratio.

Application of Two Different Basecoats and Clearcoat (Wet-on-Wet-on-Wet).

Standard automotive metal substrates (car doors) were processed and prepared with standard automotive pre-treatment, and dried and cured layers of electrocoat and primer. The substrates were then processed through a standard continuous basecoat/clearcoat automotive type application line at a continuous line speed of approximately 4 m/min, according to Table 1. In table 1, the first waterborne black basecoat composition and comparative first waterborne black basecoat compositions A and B were applied with an electrostatic bell at a flow rate of 120 cc/min. After 2 minutes under ambient conditions (i.e. 22° C. and 60% relative humidity), the second waterborne silver basecoat composition, comparative second waterborne silver basecoat composition A, comparative second waterborne silver basecoat composition B and second waterborne silver-red basecoat composition were applied over the applied first waterborne basecoats according to Table 1. Each of the second waterborne basecoat compositions were applied on top of the first waterborne black basecoat compositions wet on wet, by pneumatic atomization with robots, at a flow rate of 500 cc/min. The applied coatings were then dried by a standard force dry in a drying tunnel for approximately 5 minutes at 60° C. Following the drying step, the solventborne clearcoat composition was applied using electrostatic spray gun, and the substrate was baked 10 minutes at 120° C. In each of the examples, the film builds were as follows:

First waterborne basecoat: 15-18 microns

Second waterborne basecoat: 2-4 microns

Clearcoat: 40-45 microns

The multilayer coated car doors were in each case visually rated by 5 independent individuals according to the following scale;

1—Good polished metal effect; i.e., a highly reflective coating with a polished or anodized metal effect was obtained. No occurrence of intermixing or strike-in phenomena.

2—No polished metal effect. The system exhibited some intermixing and strike-in. Some sparkling.

3—No polished metal effect. The system exhibited strong intermixing and strike-in. Greyish appearance.

TABLE 1

| | First Waterborne black basecoat composition | Comparative first waterborne black basecoat composition A | Comparative first waterborne black basecoat composition B |
|---|---|---|---|
| Second waterborne silver basecoat composition | 1 | 3 | 2 |
| Comparative second waterborne silver basecoat composition C | n/t | 3 | 2 |
| Comparative second waterborne silver basecoat composition D | n/t | 3 | 2 |
| Second waterborne silver-red basecoat composition | 1 | n/t | n/t |

n/t means that the particular combination of basecoat compositions was not sprayed.

Subsequent work under a variety of application conditions (First waterborne basecoat composition having a flow rate in the range of 90 to 160 cc/min; and the second waterborne basecoat composition having a flow rate in the range of from 300 to 600 cc/min; varying the flash off time in the range of from 1 to 5 minutes under ambient conditions) confirmed that a coating composition according to the first waterborne black basecoat composition and the second waterborne basecoat compositions exhibit a wide application window.

What is claimed is:

1. A process of applying multiple coating layers to a substrate to obtain a polished metal appearance, the process consisting essentially of the steps:

(a) applying to at least one surface of the substrate a first waterborne basecoat that is a solid color waterborne basecoat composition that contains less than 1 percent by weight based on the total weight of the first waterborne basecoat of thin metal flake pigments having an average thickness in the range of from 10 to 100 nanometers and having an average particle diameter in the range of from 5 to 30 micrometers to obtain a coated substrate;

(b) applying over the coated substrate of step (a) a second waterborne basecoat that is a pigmented waterborne basecoat composition comprising a thin metal flake pigment, said thin metal flake pigment having an average thickness in the range of from 10 to 100 nanometers and having an average particle diameter in the range of from 5 to 30 micrometers, wherein flake to binder of the second waterborne basecoat is in the range of from 1/100 to 100/100;

(c) subjecting the coated substrate obtained in step (b) to a flash drying step;

(d) applying a clearcoat composition over the coated substrate obtained in step (c); and (e) curing the coatings applied in steps (a), (b), and (d) simultaneously in a single bake to obtain a coated substrate having a polished metal appearance;

wherein the first and second waterborne basecoat compositions comprise aqueous microgel and the first and second waterborne basecoat compositions contain sheet silicate, and wherein the second waterborne basecoat composition is formulated to be non-transparent and is applied at complete hiding.

2. The process of claim 1 wherein the first and second waterborne basecoat compositions contain in the range of from 20 percent to 70 percent by weight, based on the weight of the film forming binder, of an aqueous microgel.

3. The process of claim 1 or 2 wherein the first and second waterborne basecoat compositions contain in the range of from 0.1 percent to 1.6 percent by weight, based on the weight of the basecoat composition, of sheet silicate.

4. The process of claim 3 wherein the solids content of the second waterborne basecoat is less than the solids content of the first waterborne basecoat.

5. The process of claim 4 wherein the first basecoat composition is applied to the substrate using electrostatic or pneumatic spray equipment.

6. The process of claim 5 wherein the second waterborne basecoat composition is applied using electrostatic or pneumatic spray equipment.

7. The process of claim 6 wherein the process takes place on a continuously moving assembly line.

8. The process of claim 7 wherein the continuously moving assembly line is an automobile assembly line.

* * * * *